(12) United States Patent
Jiang et al.

(10) Patent No.: US 8,495,298 B2
(45) Date of Patent: Jul. 23, 2013

(54) METHOD FOR PROCESSING PARALLEL DATA STORAGE AND AUTHENTICATION AND A TERMINAL

(75) Inventors: Chengzhi Jiang, Shenzhen (CN); Liang Liu, Shenzhen (CN); Dianbin Lian, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/258,794

(22) PCT Filed: Dec. 7, 2010

(86) PCT No.: PCT/CN2010/079497
§ 371 (c)(1),
(2), (4) Date: Mar. 23, 2012

(87) PCT Pub. No.: WO2012/031436
PCT Pub. Date: Mar. 15, 2012

(65) Prior Publication Data
US 2012/0173817 A1 Jul. 5, 2012

(30) Foreign Application Priority Data
Sep. 9, 2010 (CN) .......................... 2010 1 0279170

(51) Int. Cl.
*G06F 12/00* (2006.01)
(52) U.S. Cl.
USPC ............................ 711/115; 711/154; 711/170
(58) Field of Classification Search
USPC ......................................... 711/115, 154, 170
See application file for complete search history.

(56) References Cited

U.S. PATENT DOCUMENTS
2008/0294560 A1  11/2008  Holtmanns et al.
2009/0077642 A1   3/2009  Eom et al.

FOREIGN PATENT DOCUMENTS
CN          101682624          3/2010

OTHER PUBLICATIONS
International Search Report issued in International Application No. PCT/CN2010/079497, completed Apr. 13, 2011, mailed May 19, 2011 (4 pages).
Written Opinion of the International Seaching Authority issued in International Application No. PCT/CN2010/079497, completed May 11, 2011, mailed May 19, 2011 (4 pages).

*Primary Examiner* — Matthew Bradley
(74) *Attorney, Agent, or Firm* — Clark & Elbing LLP

(57) ABSTRACT

The present invention discloses a method for processing parallel data storage and authentication and a terminal. In this case, the method comprises: a data processing thread of a terminal storing data into a corresponding cache area according to a type of the data, wherein the type of the data comprises authentication type and storage type, data of the authentication type is stored in a first cache area, and data of the storage type is stored in a second cache area; a scheduling processing thread of the terminal reading data from the first cache area and the second cache area alternately according to a reading rule associated with the data type, and sending the read data to a smart card of the terminal; and the smart card performing storage or authentication according to the type of the received data. By way of the present invention, the problem that data storage operation is failed when there is data authentication operation is solved, thus achieving the effect of improving terminal performance and user experience satisfaction.

15 Claims, 5 Drawing Sheets

METHOD FOR PROCESSING PARALLEL DATA STORAGE AND AUTHENTICATION AND A TERMINAL

CROSS-REFERENCE TO RELATED APPLICATIONS

This application is the U.S. National Stage filing under 35 U.S.C. §371 of International Application No. PCT/CN2010/079497, filed Dec. 7, 2010, which claims benefit of Chinese Patent Application No. 201010279170.X, filed Sep. 9, 2010.

FIELD OF THE INVENTION

The present invention relates to the communication field, and in particular to a method for processing parallel data storage and authentication and a terminal.

BACKGROUND OF THE INVENTION

Currently, mobile multimedia broadcasting mobile phone television service of China (referred to as CMMB hereinafter, i.e., China Mobile Multimedia Broadcasting) is gradually promoted nationally. With the maturation of technologies, CMMB programs have been encrypted in many cities. A set of charging solution is promoted by the State Administration of Radio, Film, and television (TV), and the solution uses a smart card to perform decryption and authentication. The smart card is a special storage card, which achieves storage and authentication decryption function by integrating a decryption authentication chip inside a secure digital (SD) card.

Since there is a need to ensure the instantaneity and smooth effect when a terminal (e.g. mobile phone) plays television programs, the priority of authentication processing is higher than that of data copy. A structural schematic diagram of parallel TV playing and data copy is shown in FIG. 1, wherein a personal computer (PC) side device comprises: a CMMB port driver adapted to send CMMB data to the data card side of the terminal, for example, the CMMB endpoint of the data card; and a Universal Serial Bus (USB) disk driver adapted to send file data to be copied to the data card side of the terminal, for example, the USB disk endpoint of the data card.

After having received the data, the CMMB endpoint and USB disk endpoint of a data card at the terminal side respectively inform a corresponding CMMB data processing thread and a USB disk data processing thread; and the CMMB data processing thread and the USB disk data processing thread import, according to their own data priority, the data into a synchronization module of a Central Processing Unit (CPU) to perform synchronization processing, and send the data to the smart card after the synchronization processing.

Since the priority of the CMMB data processing thread (also referred to as TV playing thread) is higher than that of the USB disk data processing thread (also referred to as data copy thread), the CPU of the terminal will be occupied by the TV playing thread all the time, while the data copy thread cannot seize CPU resources for a long time; the communication between the data copy thread and the PC side is overtime; and the PC side deems that a file is not copied successful and file copy is interrupted, which causes the storage of data on the smart card failed.

SUMMARY OF THE INVENTION

The present invention provides a method for processing parallel data storage and authentication and a terminal so as to at least solve the above problem that data storage is failed when the data storage and authentication are parallel.

A method for processing parallel data storage and authentication is provided according to one aspect of the present invention, and the method comprises: a data processing thread of a terminal storing data into a corresponding cache area according to a type of the data, wherein the type of the data comprises authentication type and storage type, data of the authentication type is stored in a first cache area, and data of the storage type is stored in a second cache area; a scheduling processing thread of the terminal reading data from the first cache area and the second cache area alternately according to a reading rule associated with the data type, and sending the read data to a smart card of the terminal; and the smart card performing storage or authentication according to the type of the received data.

A terminal is provided according to another aspect of the present invention, and comprises: a data processing module adapted to store data into a corresponding area according to a type of the data, wherein the type of the data comprises authentication type and storage type, data of the authentication type is stored in a first cache area, and data of the storage type is stored in a second cache area; a scheduling processing module, adapted to read data from the first cache area and the second cache area alternately according to a reading rule associated with the data type, and send the read data to a smart card module of the terminal; and the smart card module, adapted to perform storage or authentication according to the type of the received data.

The present invention reads data in two cache areas according to a reading rule associated with data type, which enables data storage operation to be completed successfully, and solves the problem that data storage is failed when the data storage and authentication are parallel, thus achieving the effect of improving terminal performance and user experience satisfaction.

BRIEF DESCRIPTION OF THE DRAWINGS

The drawings illustrated here provide a further understanding of the present invention and form a part of the present application. The exemplary embodiments and the description thereof are used to explain the present invention without unduly limiting the scope of the present invention, wherein.

DETAILED DESCRIPTION OF THE EMBODIMENTS

The present invention will be described hereinafter in detail with reference to the accompanying drawings and in conjunction with embodiments. It needs to note that the embodiments of the present application and the features in the embodiments can be combined with each other if there is no conflict.

The terminal (for example, a mobile phone) of the embodiments of the present invention duly enables a data copy thread to obtain CPU resources to carry out the data storage operation in the situation that data storage and authentication are parallel, so as to solve the problem in this situation that data storage operation is failed. Based on the above situation, the embodiments of the present invention provide a method for processing parallel data storage and authentication and a terminal.

Embodiment 1

Figure 1:
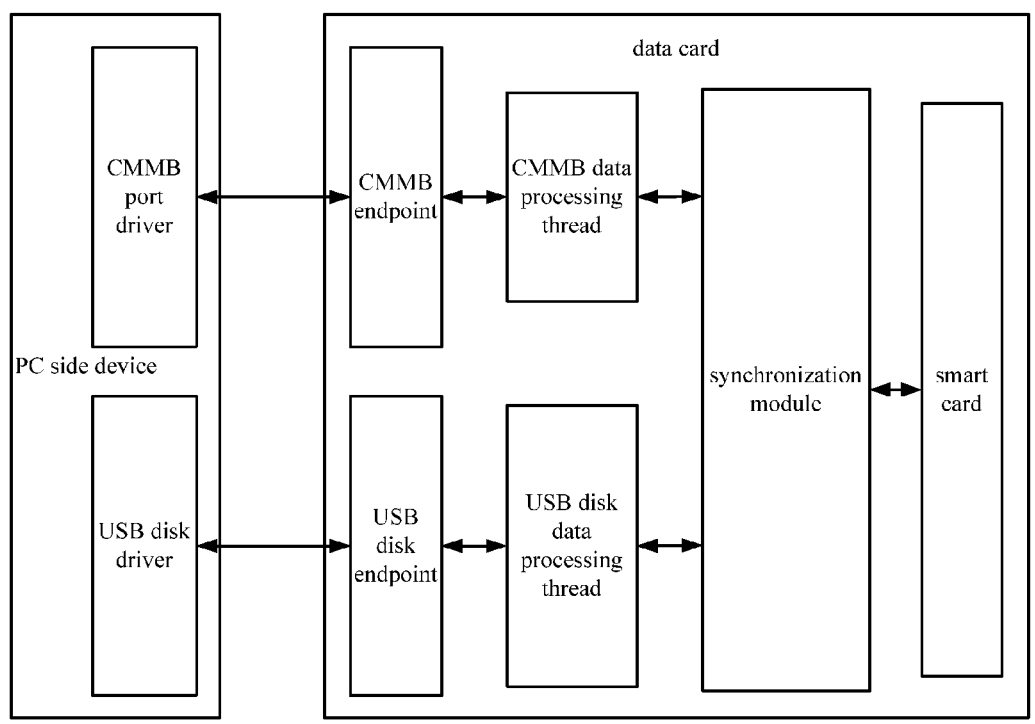
FIG. 1 is a structural schematic diagram of parallel TV playing and data copy according to the related art.
Figure 2:
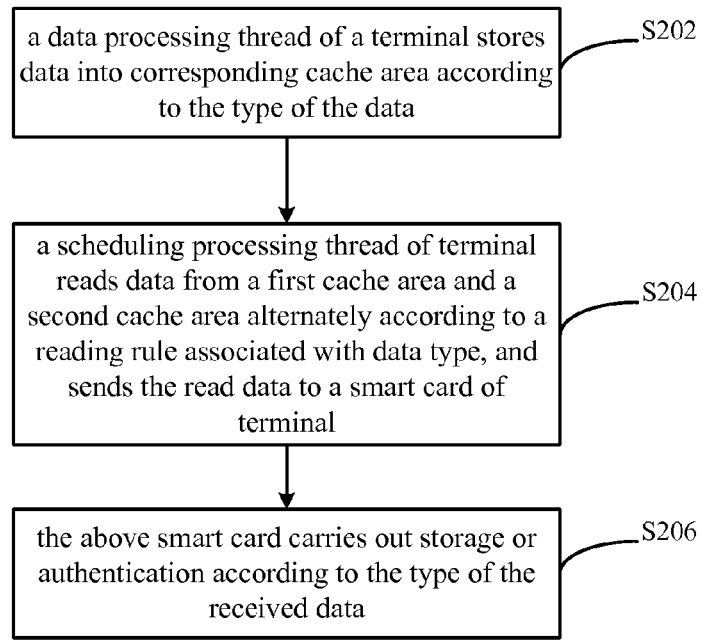
FIG. 2 is a flowchart of a method for processing parallel data storage and authentication according to Embodiment 1 of the present invention.

FIG. 2 is a flowchart of a method for processing parallel data storage and authentication according to the embodiments of the present invention, and the method includes the following steps S202 to S206.

Step S202: a data processing thread of a terminal stores data into a corresponding cache area according to the type of the data, wherein the type of the data includes a authentication type and a storage type, with data of the authentication type being stored in a first cache area and data of the storage type being stored in a second cache area.

the data of the authentication type in the embodiments of the present invention can be data which are encrypted such as TV service data, film service data; the instantaneity requirement of such data is high, for example, the TV service data requires that it can be smooth when playing the data, and therefore, generally the priority of such data is relatively high; while, generally, the instantaneity requirement of the data of the storage type is relatively low, and therefore, generally, the priority of such data is relatively low.

Step S204: a scheduling processing module of the terminal reads data from the first cache area and the second cache area alternately according to a reading rule associated with the data type, and sends the read data to a smart card module of the terminal.

In this case, the reading rule associated with data type is that: the number of times of consecutive reading (for example, it is represented by N1) corresponding to the data of the authentication type is greater than the number of times of consecutive reading N2 (for example, it is represented by N2) corresponding to the data of the storage type.

Considering that each type of data generally correspond to different priorities, this embodiment may also set the reading rule associated with data type as that: the priority of the data of the authentication type is higher than that of the data of the storage type, and the number of times of consecutive reading (for example, it is represented by N1) corresponding to the data with high priority is greater than the number of times of consecutive reading (for example, it is represented by N2) corresponding to the data with low priority.

The above number of times of consecutive reading can also be represented by the duration of data reading, for example, the reading duration of data of the authentication type is set as being greater than the reading duration of data of the storage type, and other processing modes keep unchanged.

According to the above set reading rule associated with data type, the scheduling processing thread of the terminal reads data from the first cache area for N1 times consecutively, then reads data from the second cache area for N2 times consecutively, and sends the read data to the smart card of the terminal after each time reading the data; and this step is repeatedly performed till the first cache area and/or second cache area are/is empty.

Preferably, the above step S204 can be performed according to the following manner:

Step A: the terminal sets a global variable N, wherein an initial value of N is the above N1, and the scheduling processing thread of the terminal sets N as 0 when there are data in the first cache area;

Step B: the scheduling processing thread reads data from the first cache area, sends the read data to the smart card of the terminal, and then adds N with 1; and step B is repeatedly performed till N is equal to N1, N is set as 0 and step C is performed; and Step C: the scheduling processing thread reads data from the second cache area, sends the read data to the smart card till N is equal to the above N2, sets N as 0, and return step B till the first cache area and/or second cache area are/is empty.

When the first cache area or second cache area is empty, the scheduling processing thread consecutively reads the data in the cache area which is not empty in the first cache area and second cache area, and sends the read data to the smart card. That is, under this situation, it no longer needs to consider reading the data in the two cache areas alternately and the data in the cache area which has data to be read can be just read out.

Step S206: the above smart card module performs storage or authentication according to the type of the received data.

For example, when determining that the type of the received data is the authentication type, the smart card performs authentication on the received data; and when determining that the type of the received data is the storage type, the smart card performs storage on the received data.

This embodiment enables data storage operation to be carries out successfully by reading the data from two cache areas according to the reading rule associated with the data type, which solves the problem that the data storage is failed when the data storage and authentication are parallel. This manner not only ensures the instantaneity of authentication data, but also ensures that the interaction with PC side during data copy will not be timeout, thus achieving the effect of parallel processing and improving terminal performance and user experience satisfaction.

Embodiment 2

Figure 3:
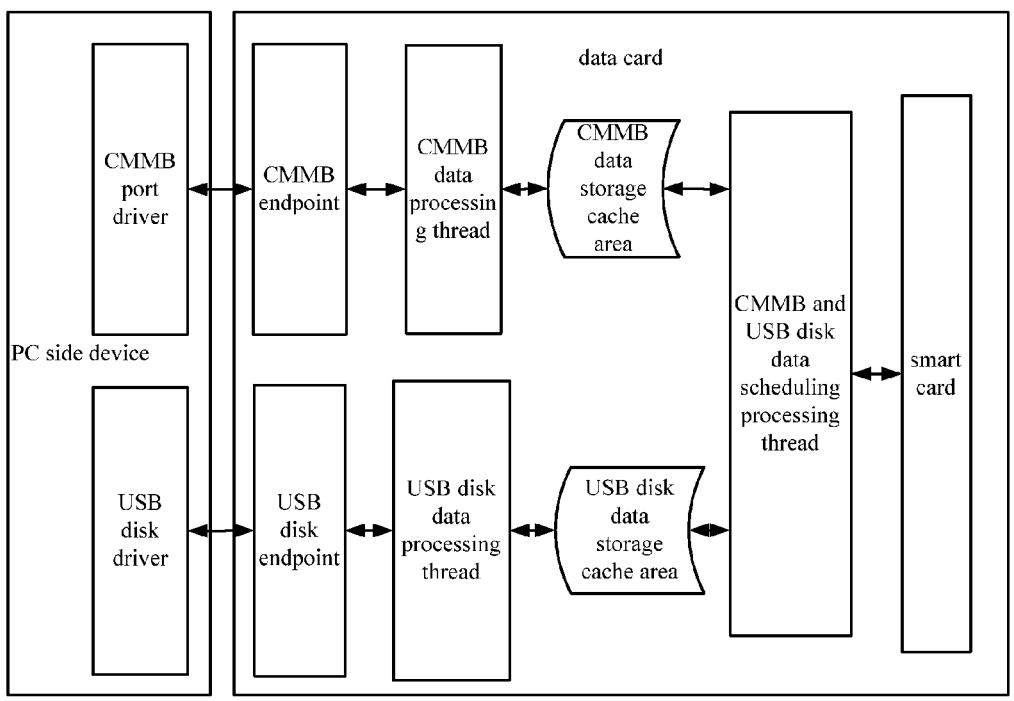
FIG. 3 is a structural schematic diagram of parallel TV playing and data copy according to Embodiment 2 of the present invention.

This embodiment takes TV playing data as data of authentication type, and FIG. 3 is a structural schematic diagram of parallel TV playing and data copy, wherein a PC side device includes: a CMMB port driver and a USB disk driver; and the data card of a terminal includes: a CMMB endpoint, a USB disk endpoint, a CMMB data processing thread, a USB disk data processing thread, a CMMB data storage cache area (corresponding to the first cache area in Embodiment 1), a USB disk data storage cache area (corresponding to the second cache area in Embodiment 1), a CMMB and USB disk data scheduling processing thread and a smart card. Both "CMMB data processing thread" and the "U disk data processing thread" are called as "data reading thread" (corresponding to the data processing thread in Embodiment 1) in this embodiment. The work of each module is as follows.

The CMMB port driver and the USB disk driver of the PC side device respectively send data to the terminal side; after having received the data, the corresponding endpoint (the CMMB endpoint or the USB disk endpoint) of the terminal side informs the corresponding thread (the CMMB data processing thread or the USB disk processing thread); and after having read the data, the corresponding threads respectively store the data into their corresponding cache area, and the CMMB and USB disk data scheduling processing thread (also referred to as the data scheduling processing thread) read the data according to a preset reading rule associated with the data type after having inquired that there are data in the cache area. In this case, the reading rule associated with the data type can be the reading rule in Embodiment 1. The CMMB and USB disk data scheduling processing thread send the read data to the smart card.

Figure 4:
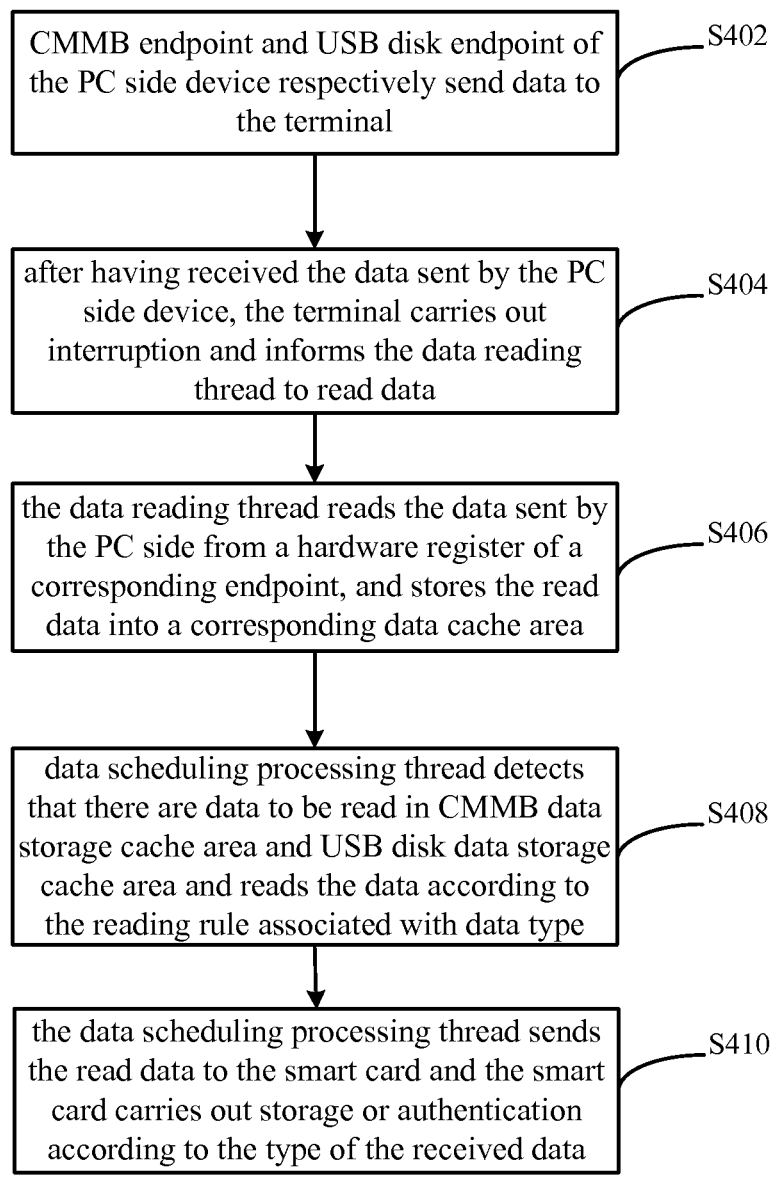
FIG. 4 is a flowchart of a method for processing parallel data storage and authentication according to Embodiment 2 of the present invention.

The method for processing parallel mobile phone TV data and copy data will be described in detail by taking the structure shown in FIG. 3 as an example hereinafter; and referring to FIG. 4, this processing method includes the following steps S402 to S410.

Step S402: the CMMB endpoint and the USB disk endpoint of the PC side device respectively send data to the terminal.

Since the terminal connects a plurality of devices at the PC side via USB, wherein the plurality of devices includes a SD card device and a mobile phone device, and these devices are connected via the endpoints of the USB. One USB includes 7 endpoints. In this case, endpoint 1 is used for connecting the TV device, and endpoint 2 is used for connecting the SD card device. When the PC side device sends different data (mobile phone TV data or copy data), they are actually sent to different endpoints. In this embodiment, the mobile phone TV data is sent to the CMMB endpoint, and the copy data is sent to the USB disk endpoint.

Step S404: after having received the data sent from the PC side device, the terminal carries out interruption and informs the data reading thread to read data.

When a PC side software sends data to the data card, whether they are mobile phone TV data or data to be copied, the terminal will generate a hardware interruption, and the ISR function of interruption processing will be invoked by a system. Here, the ISR of interruption is an interruption processing module. After having detected that an interruption is generated, the interruption processing module will detect which endpoint generates interruption according to the state bit of a hardware register, thereby judging whether the data is the mobile phone TV data or the data of a copy file.

When the interruption processing module determines the data type, it will respectively invoke the "CMMB data processing thread" or the "USB disk data processing thread" according to the situations. This embodiment is to invoke the data reading thread.

Step S406: the data reading thread reads the data sent from the PC side from the hardware register of a corresponding endpoint, and stores the read data into a corresponding data cache area, which is the "CMMB data storage cache area" or the "USB disk data storage cache area" in this embodiment.

When the interruption processing module informs the data reading thread that there are data to be read, since it has been judged that the data type is the mobile phone TV data or the data of file copy previously, the data reading thread directly reads out the data sent from the PC side from the hardware register of the corresponding endpoint, and then respectively stores the same into the corresponding data cache area, i.e. the "CMMB data storage cache area" or the "USB disk data storage cache area"; and when the data reading thread stores the data into the corresponding cache area, it continues to wait a next data reading notification of the interruption processing module.

Both CMMB data storage cache area and the USB disk data storage cache area are global variables, can be achieved by a queue of a operation system, and can also be achieved by other manners, and the main object of which is to respectively store corresponding mobile phone TV data and file copy data.

Step S408: the data scheduling processing thread detects that there are data to be read in the CMMB data storage cache area and the USB disk data storage cache area, and reads the data according to the reading rule associated with the data type.

Step S410: the data scheduling processing thread sends the read data to the smart card, and the smart card carries out storage or authentication according to the type of the received data.

This embodiment refers to the CMMB data and the USB disk data scheduling processing thread as the "data call processing thread", and the data call processing thread detects whether there are data to be read in the CMMB data storage cache area or the USB disk data storage cache area non-stop. Assuming that there is mobile phone TV data to be read, the data call processing thread first reads the TV data from the CMMB data storage cache area, and then sends the same to the smart card via an interface of the smart card to carry out relevant processing such as authentication, decryption, and after a series of operations, the data call processing thread acquires clear stream data of the mobile phone TV, which is decrypted data. The data call processing thread sends the clear stream data to the PC side device for playing via an interface provided by a USB layer, and the series operations about acquiring the clear stream here are same as the processing in the related art, and will not be described redundantly.

After the data call processing thread sends the clear stream data to the PC side, it carries out the operation of adding 1 on a predefined global variable, and the global variable indicates the number of times for processing the mobile phone TV data.

The data call processing thread subsequently checks whether this predefined global variable N is equal to the number of times of consecutively reading the mobile phone TV data N1 in the above reading rule, and in this embodiment, N1 is 6, and N2, i.e. the number of times of consecutively reading copy data N2, is 1. If N is equal to 6, a packet of data are read out from the USB disk data storage cache area next time; then the file copy data are sent to the smart card via an interface; and after the processing of a packet of file copy data is completed, the global variable N is set as 0. Thus, in the following, the file copy data can only be processed once after the mobile phone TV data are processed for six times consecutively, which achieves the relationship of the number of times of the mobile phone TV data processing and the number of times of the file copy processing is 6:1. Of course, this ratio relationship can be modified and can be adjusted according to practical situations.

The above method gives out the situation that the data call processing thread detects that there are data to be processed in the TV data storage cache area, likewise, when the data call processing thread detects that there are data in the cache area corresponding to the copy data, the data will be read out from the corresponding cache area; then relevant interface functions provided by the smart card are invoked to write the data to be stored into the smart card, and acknowledgement information after the data have been written successfully is sent to the PC side device via the interface functions provided by the USB; and the PC side device will continue to write a next packet of file copy data into the smart card after detecting the acknowledgement information. In order to avoid problem occurring when only data is copied and TV is not played, the above global variable N is set as N1 during initialization, and in this embodiment it is 6; and when it needs to carry out TV services, the global variable N is set as 0.

This embodiment combines the mobile phone playing thread and the data copy thread together, and uses one thread (data call processing thread) to carry out processing. Of course, in order to ensure the playing of mobile phone TV to be smooth, the priority of the mobile phone TV playing thread is still higher than that of the data copy thread. However, since this embodiment uses one thread to carry out processing, it still can carry out control according to the priorities, and the priority ratio used by this embodiment is 6:1. When the TV playing and data copy threads are parallel, the TV playing data is processed first and one packet of data copy data will be processed after processing six packets of the TV playing data. Therefore, it is not only ensures TV playing to be smooth but also ensures that the interaction with the PC side during data copy will not be timeout, thus achieving the effect of being parallel.

Embodiment 3

Figure 5:
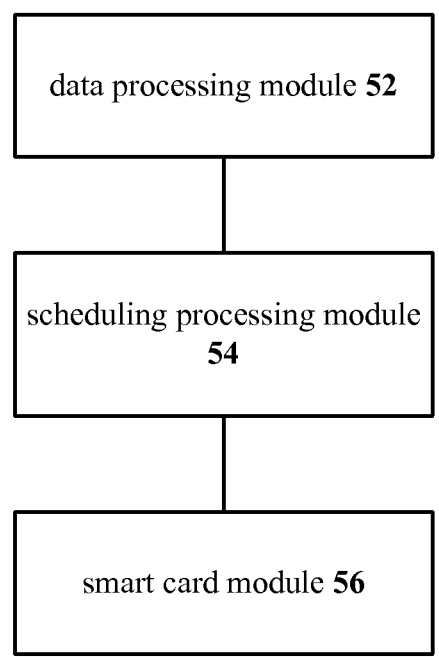
FIG. 5 is a structural block diagram of a terminal according to Embodiment 3 of the present invention.

FIG. 5 shows a structural block diagram of a terminal according to the embodiments of the present invention; and the terminal includes:

a data processing module 52 adapted to store data into a corresponding area according to the type of the data, wherein the type of the data includes a authentication type and a storage type, with data of the authentication type being stored in a first cache area and data of the storage type being stored in a second cache area;

the data of the authentication type in the embodiments of the present invention can be data which are encrypted such as TV service data, film service data; the instantaneity requirement of such data is rather high, for example, the TV service data requires that it can be smooth when playing this data, therefore, generally the priority of such data is relatively high; while, generally, the instantaneity requirement of data of the storage type is relatively low, therefore, generally, the priority of such data is relatively low;

a scheduling processing module 54 adapted to read data from the first cache area and the second cache area alternately according to a reading rule associated with the data type and send the read data to a smart card module 56 of the terminal; and the smart card module 56 adapted to perform storage or authentication according to the type of the received data.

Figure 6:
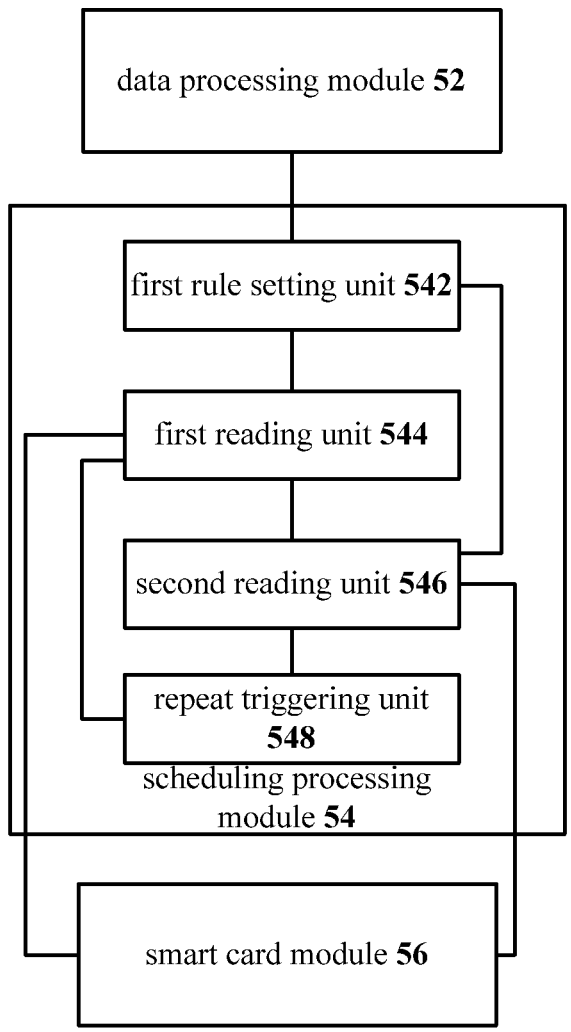
FIG. 6 is a particular structural block diagram of a terminal according to Embodiment 3 of the present invention.

FIG. 6 is a particular structural block diagram of a terminal, wherein the scheduling processing module 54 includes: a first rule setting unit 542 adapted to set the reading rule associated with the data type as that: the number of times of consecutive reading (for example, it is represented by N1) corresponding to the data of the authentication type is greater than the number of times of consecutive reading (for example, it is represented by N2) corresponding to the data of the storage type.

Alternatively, considering that each type of data generally corresponds to different priorities, the scheduling processing module 54 of this embodiment can also include: a second rule setting unit adapted to set the reading rule associated with the data type as that: the priority of the data of the authentication type is higher than that of the data of the storage type, and the number of times of consecutive reading (for example, it is represented by N1) corresponding to the data with a higher priority is greater than the number of times of consecutive reading (for example, it is represented by N2) corresponding to the data with a lower priority.

The above number of times of consecutive reading can also be represented by the duration of data reading, for example, the reading duration of data of the authentication type is set as being greater than the reading duration of data of the storage type, and other processing modes are kept unchanged.

Preferably, the scheduling processing module 54 also includes:

a first reading unit 544, connected to the first rule setting unit 542, and adapted to read the data from the first cache area for N1 times consecutively, and to send the read data to the smart card module 56 after each time reading the data;

a second reading unit 546, connected to the first rule setting unit 542 and the first reading unit 544, and adapted to read data from the second cache area for N2 times consecutively after the first reading unit read the data for N1 times consecutively, and to send the read data to the smart card module 56 after each time reading the data; and a repeat triggering unit 548, connected to the first reading unit 544 and the second reading unit 546, adapted to trigger the first reading unit 544 to read data after the second reading unit 546 reads data for N2 times consecutively till the first cache area and/or second cache area are/is empty.

Preferably, the above scheduling processing module 54 can read data according to the following manners:

Step A: a global variable N is set, wherein the initial value of N is the above N1, and N is set as 0 when there are data in the first cache area;

Step B: read data from the first cache area, send the read data to the smart card module 56 of the terminal, and then add N with 1; and step B are repeatedly performed till N is equal to N1, N is set as 0 and step C is performed; and Step C: read data from the second cache area, send the read data to the smart card module 56 till N is equal to the above N2, set N as 0, and return step B till the first cache area and/or second cache area are/is empty.

Preferably, the scheduling processing module 54 includes: a third reading unit adapted to read the data in a cache area which is not empty in the first cache area and second cache area when the first cache area or the second cache area is empty, and send the read data to the smart card module 56. That is, under this situation, it no longer needs to consider reading the data in two cache areas alternately, and the data in the cache area which has data to be read can be just read out.

Preferably, the smart card module 56 includes:

an authentication processing module adapted to carry out authentication on the received data when determining that the type of the received data is the authentication type; and a storage processing unit adapted to carry out storage on the received data when determining that the type of the received data is the storage type.

After reading the data of the authentication type out from the first cache area, the above scheduling processing module 54 sends the same to the smart card module 56 via an interface of the smart card module 56 to carry out relevant processing such as authentication, decryption; and after a series of operations, the data invoke processing module 54 acquires clear stream data, i.e. decrypted data. The data invoke processing module 54 sends, via an interface provided by the USB layer, the clear stream data to the PC side device for playing, and the series operations about acquiring clear stream here are same with the processing in the related art, and will not be described redundantly.

When detecting that there are data in the second cache area, the data invoke processing module 54 will read the data from the corresponding cache area, invoke relevant interface functions provided by the smart card module 56 to write data to be stored into the smart card module 56, and send acknowledgement information after the data have been written successfully to the PC side device via an interface provided by the USB. The PC side device will continue to write a next packet of file copy data into the smart card module 56 after detecting the acknowledgement information. In order to avoid problem occurring when only data is copied and TV is not played, the above global variable N is set as N1 during initialization, and when there is data of the authentication type to be processed, the global variable N is set as 1.

This embodiment enables data storage operation to be completed successfully by reading the data in two cache areas according to a reading rule associated with the data type, which solves the problem that data storage is failed when the above data storage and authentication are parallel. This manner not only ensures the instantaneity of the authentication data but also ensures that the interaction with the PC side during data copy will not be timeout, thus achieving the effect of parallel processing and improving terminal performance and user experience satisfaction.

The above embodiments carry out authentication processing and storage crossly, which effectively solves the problem that the processing of data with a lower priority is failed caused by only data with a higher priority are processed when the priorities are different, thereby improving the practicability of terminal and ensuring the processing instantaneity of data with higher priority.

Obviously, those skilled in the art shall understand that individual modules and individual steps of the present invention can be implemented with general computing devices, they may be integrated in a single computing device or distributed in network formed by a plurality of computing devices, optionally, they may be implemented by using program codes executable by computing devices, thus they may be stored in memory devices for execution by the computing devices, or implemented by making them into integrated circuit module respectively, or by making several means or steps in to a single IC. Thus, the present invention is not limited to any particular combination of hardware and software.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. A method for processing parallel storage and authentication of data, comprising:
    a data processing thread of a terminal storing data into a corresponding cache area according to a type of the data, wherein the type of the data comprises authentication type and storage type, data of the authentication type is stored in a first cache area, and data of the storage type is stored in a second cache area;
    a scheduling processing thread of the terminal reading data from the first cache area and the second cache area alternately according to a reading rule associated with the data type, and sending the read data to a smart card of the terminal; and
    the smart card performing storage or authentication according to the type of the received data.

2. The method according to claim 1, wherein the reading rule associated with data type is that: a number of times of consecutive reading N1 corresponding to the data of the authentication type is greater than a number of times of consecutive reading N2 corresponding to the data of the storage type.

3. The method according to claim 1, wherein the reading rule associated with data type is that: a priority of the data of the authentication type is higher than that of the data of the storage type, and a number of times of consecutive reading N1 corresponding to the data with a higher priority is greater than a number of times of consecutive reading N2 corresponding to the data with a lower priority.

4. The method according to claim 2, wherein the step of a scheduling processing thread of the terminal reading data from the first cache area and the second cache area alternately according to a reading rule associated with the data type, and sending the read data to a smart card of the terminal comprises:
    the scheduling processing thread of the terminal reading data from the first cache area for N1 times consecutively, then reading data from the second cache area for N2 times consecutively, and sending the read data to the smart card of the terminal after reading the data each time; and repeatedly performing this step till the first cache area and/or the second cache area are/is empty.

5. The method according to claim 2, wherein the step of a scheduling processing thread of the terminal reading data from the first cache area and the second cache area alternately according to a reading rule associated with the data type, and sending the read data to a smart card of the terminal comprises:
    Step A: the terminal setting a global variable N, wherein an initial value of N is N1, when there are data in the first cache area, the scheduling processing thread of the terminal sets N as 0;
    Step B: the scheduling processing thread reading data from the first cache area, sending the read data to the smart card of the terminal, and adding N with 1; and repeatedly performing the step B till N is equal to N1, setting N as 0, and performing step C; and
    Step C: the scheduling processing thread reading data from the second cache area, sending the read data to the smart card till N is equal to N2, setting N as 0, and returning to the step B till the first cache area and/or the second cache area are/is empty.

6. The method according to claim 1, wherein when the first cache area or the second cache area is empty, the scheduling processing thread continues to read data from a cache area which is not empty in the first cache area and the second cache area, and sending the read data to the smart card.

7. The method according to claim 1, wherein the step of the smart card performing storage or authentication according to the type of the received data comprises:
    the smart card performing authentication on the received data when determining that the type of the received data is the authentication type; and
    the smart card performing storage on the received data when determining that the type of the received data is the storage type.

8. A terminal, comprising:
    a data processing module adapted to store data into a corresponding area according to a type of the data, wherein the type of the data comprises a authentication type and a storage type, data of the authentication type is stored in a first cache area, and data of the storage type is stored in a second cache area;
    a scheduling processing module, adapted to read data from the first cache area and the second cache area alternately according to a reading rule associated with the data type, and send the read data to a smart card module of the terminal; and
    the smart card module, adapted to perform storage or authentication according to the type of the received data.

9. The terminal according to claim 8, wherein the scheduling processing module comprises:
    a first rule setting unit adapted to set the reading rule associated with data type as that: a number of times of consecutive reading N1 corresponding to the data of the authentication type is greater than a number of times of consecutive reading N2 corresponding to the data of the storage type.

10. The terminal according to claim 8, wherein the scheduling processing module comprises:
    a second rule setting unit, adapted to set the reading rule associated with data type as that: a priority of the data of the authentication type is higher than that of the data of the storage type, and a number of times of consecutive reading N1 corresponding to the data with a higher priority is greater than a number of times of consecutive reading N2 corresponding to the data with a lower priority.

11. The terminal according to claim 9, wherein the scheduling processing module comprises:
- a first reading unit, adapted to read the data from the first cache area for N1 times consecutively, and send the read data to the smart card module after reading the data each time;
- a second reading unit, adapted to read the data from the second cache area for N2 times consecutively after the first reading unit reads the data for N1 times consecutively, and send the read data to the smart card module after reading the data each time; and
- a repeat triggering unit, adapted to trigger the first reading unit to read data after the second reading unit reads data for N2 times consecutively till the first cache area and/or second cache area are/is empty.

12. The terminal according to claim 8, wherein the scheduling processing module comprises:
- a third reading unit, adapted to read data from a cache area which is not empty in the first cache area and the second cache area when the first cache area or the second cache area is empty, and send the read data to the smart card module.

13. The method according to claim 3, wherein the step of a scheduling processing thread of the terminal reading data from the first cache area and the second cache area alternately according to a reading rule associated with the data type, and sending the read data to a smart card of the terminal comprises:
- the scheduling processing thread of the terminal reading data from the first cache area for N1 times consecutively, then reading data from the second cache area for N2 times consecutively, and sending the read data to the smart card of the terminal after reading the data each time; and repeatedly performing this step till the first cache area and/or the second cache area are/is empty.

14. The method according to claim 3, wherein the step of a scheduling processing thread of the terminal reading data from the first cache area and the second cache area alternately according to a reading rule associated with the data type, and sending the read data to a smart card of the terminal comprises:
- Step A: the terminal setting a global variable N, wherein an initial value of N is N1, when there are data in the first cache area, the scheduling processing thread of the terminal sets N as 0;
- Step B: the scheduling processing thread reading data from the first cache area, sending the read data to the smart card of the terminal, and adding N with 1; and repeatedly performing the step B till N is equal to N1, setting N as 0, and performing step C; and
- Step C: the scheduling processing thread reading data from the second cache area, sending the read data to the smart card till N is equal to N2, setting N as 0, and returning to the step B till the first cache area and/or the second cache area are/is empty.

15. The terminal according to claim 10, wherein the scheduling processing module comprises:
- a first reading unit, adapted to read the data from the first cache area for N1 times consecutively, and send the read data to the smart card module after reading the data each time;
- a second reading unit, adapted to read the data from the second cache area for N2 times consecutively after the first reading unit reads the data for N1 times consecutively, and send the read data to the smart card module after reading the data each time; and
- a repeat triggering unit, adapted to trigger the first reading unit to read data after the second reading unit reads data for N2 times consecutively till the first cache area and/or second cache area are/is empty.

* * * * *